US009294763B2

(12) United States Patent

Solhusvik et al.

(10) Patent No.: US 9,294,763 B2

(45) Date of Patent: Mar. 22, 2016

(54) SELF TEST OF IMAGE SIGNAL CHAIN WHILE RUNNING IN STREAMING MODE

(71) Applicant: Semiconductor Components Industries, LLC, Phoenix, AZ (US)

(72) Inventors: Johannes Solhusvik, Haslum (NO); Tore Martinussen, Strommen (NO)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/456,959

(22) Filed: Aug. 11, 2014

(65) Prior Publication Data

US 2014/0347496 A1 Nov. 27, 2014

Related U.S. Application Data

(62) Division of application No. 13/248,120, filed on Sep. 29, 2011, now Pat. No. 8,803,979.

(51) Int. Cl.

*H04N 17/02* (2006.01)
*H04N 5/378* (2011.01)
*H04N 17/00* (2006.01)

(52) U.S. Cl.

CPC ............. *H04N 17/002* (2013.01); *H04N 5/378* (2013.01)

(58) Field of Classification Search

None

See application file for complete search history.

(56) References Cited

U.S. PATENT DOCUMENTS 5,844,615 A * 12/1998 Nuber et al. ............. 375/240.01
5,962,844 A 10/1999 Merrill
6,618,084 B1 9/2003 Rambaldi
7,804,052 B2 9/2010 Chinnaveerappan
2002/0030753 A1 3/2002 Kramer
2005/0128325 A1 6/2005 Fraenkel
2005/0184218 A1 8/2005 Schauerte
2008/0303905 A1* 12/2008 Chinnaveerappan ......... 348/187
2012/0033121 A1 2/2012 Kawata
2012/0154655 A1 6/2012 Compton et al.
2012/0169909 A1* 7/2012 Rysinski et al. .............. 348/302

* cited by examiner

*Primary Examiner* — Michael Teitelbaum

(74) *Attorney, Agent, or Firm* — Treyz Law Group, P.C.; Zachary D. Hadd; Kendall P. Woodruff

(57) ABSTRACT

An imager including a self test mode. The imager includes a pixel array for providing multiple pixel output signals via multiple columns; and a test switch for (a) receiving a test signal from a test generator and (b) disconnecting a pixel output signal from a column of the pixel array. The test switch provides the test signal to the column of the pixel array. The test signal includes a test voltage that replaces the pixel output signal. The test signal is digitized by an analog-to-digital converter (ADC) and provided to a processor. The processor compares the digitized test signal to an expected pixel output signal. The processor also interpolates the output signal from a corresponding pixel using adjacent pixels, when the test switch disconnects the pixel output signal from the column of the pixel array.

20 Claims, 12 Drawing Sheets

SELF TEST OF IMAGE SIGNAL CHAIN WHILE RUNNING IN STREAMING MODE

This application is a division of patent application Ser. No. 13/248,120, filed Sep. 29, 2011, which is hereby incorporated by reference herein in its entirety. This application claims the benefit of and claims priority to patent application Ser. No. 13/248,120, filed Sep. 29, 2011.

FIELD OF THE INVENTION

The present invention relates in general, to image sensors. More specifically, the present invention relates to systems and methods for running online tests of an image sensor's signal chain, without losing data or frame rate.

BACKGROUND OF THE INVENTION

Automotive safety critical applications, such as emergency braking to prevent a crash, require that the CMOS imager runs self tests at regular intervals during operation to detect any failure mechanism that may occur due to reliability issues. As other examples, imagers are used as sensors in lane tracking systems, edge-of-road detection systems, near-obstacle-avoidance detection systems, crash alert systems and passenger position sensing systems. Such safety critical applications require imagers with high reliability.

Conventional imagers are tested at the manufacturer using precision equipment to inject a known quantity of light and compare the imager output to the expected output resulting from the known quantity of light. Such test equipment is generally sophisticated and correspondingly expensive. Additionally, operational testing at the manufacturer using precision equipment to inject a known quantity of light and compare the imager output to the expected output resulting from the known quantity of light. Such test equipment is generally sophisticated and correspondingly expensive.

As will be described, the present invention provides systems and methods for testing an image sensor's analog chain, without losing data or frame rate. It may be implemented at a minimal cost and is suitable for both column parallel and serial architecture sensors. The test circuitry may also be used to verify that the sensor's column address range and sequence are correct.

As will also be described, the present invention may provide a test which is inserted into the data path during vertical blanking, such that the test may run without disturbing the regular image capture function of the imager. The test pattern may also be altered for each frame, so that the adequate test coverage is achieved over multiple frames of operation.

BRIEF DESCRIPTION OF THE FIGURES

The present invention may be understood from the following detail description when read in connection with the accompanying figures.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

The term "pixel," as used herein, refers to a photo-element unit cell containing a photosensor and associated transistors for converting photons to an electrical signal. For purposes of illustration, a small number of representative pixels are illustrated in the figures and description herein; however, typically fabrication of a large plurality of like pixels proceeds simultaneously. Accordingly, the following detailed description is not to be taken in a limiting sense; and the scope of the present invention is defined only by the appended claims.

In addition, although the invention is described below with reference to a CMOS imager, the invention has applicability to any solid state imaging device having a storage node which is reset and then has charges transferred to it. The following detailed description is, therefore, not to be taken in a limiting sense, and the scope of the present invention is defined only by the appended claims.

Figure 1:
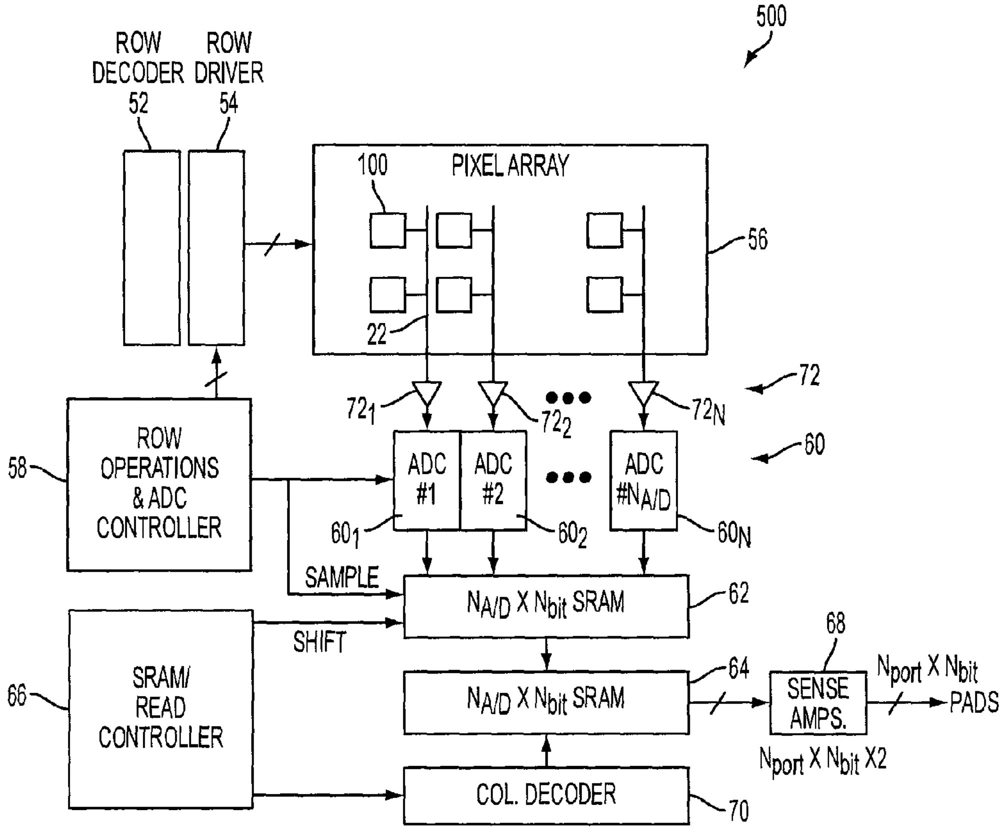
FIG. 1 is a block diagram of an imager.

Now referring to the figures, where like numerals designate like elements, FIG. 1 shows a CMOS imager 500 comprising a pixel array 56 containing multiple pixels 100 organized into a plurality of rows and columns. The device 500 also contains a row decoder 52, row driver 54, row operations and ADC (analog-to-digital converter) controller 58, a plurality of analog-to-digital converters $\mathbf{60}_1$, $\mathbf{60}_2$, . . . , $\mathbf{60}_n$ (collectively analog-to-digital converters 60), a static random access memory (SRAM)/read controller 66, a plurality of sample and hold (S/H) and amplifier circuits $\mathbf{72}_1$, $\mathbf{72}_2$, . . . , $\mathbf{72}_n$ (collectively S/H circuits 72), two memory banks 62, 64, sense amplifier circuitry 68 and a column decoder 70.

The S/H circuits 72 are connected to the column lines 22 of the array 56. The analog-to-digital converters 60 are connected to the S/H circuits 72 by what is commonly known as a column-parallel architecture. That is, in the illustrated imaging device 500, each column or column line 22 of the array 56 is connected to a respective analog-to-digital converter 60, which operate in parallel to convert analog signals from the array 56 (via the S/H circuitry 72) to digital signals.

The imaging device 500 is operated by the row operations and ADC controller 58, which controls the row driver 54 and the analog-to-digital converters 60. The row operations and ADC controller 58 also issues a sample control signal SAMPLE to the first memory bank 62, which is illustratively an SRAM device. The second controller, i.e., the SRAM/read controller 66 also controls the operation of the imaging device 500 by controlling the second memory bank 64 which is a SRAM device via a shift control signal SHIFT, and by controlling the column decoder 70.

In operation, row lines are selectively activated by the row driver 54 in response to the row decoder 52. The S/H circuits 72 input a pixel reset signal VRST and a pixel image signal VSIG for selected pixels. A differential signal is produced, by a differential amplifier within the S/H circuits 72, for each pixel and is digitized by the analog-to-digital converters 60. The digitizing of the data from each column is performed in parallel. The digitized signals are stored in the first memory bank 62 (when the sample control signal SAMPLE is issued) and subsequently shifted into the second memory bank 64. The sense amplifier circuitry 68 senses the stored digital data from the second memory bank 64 and outputs the digital information so that it may be processed by, for example, an image processor (not shown).

Figure 2:
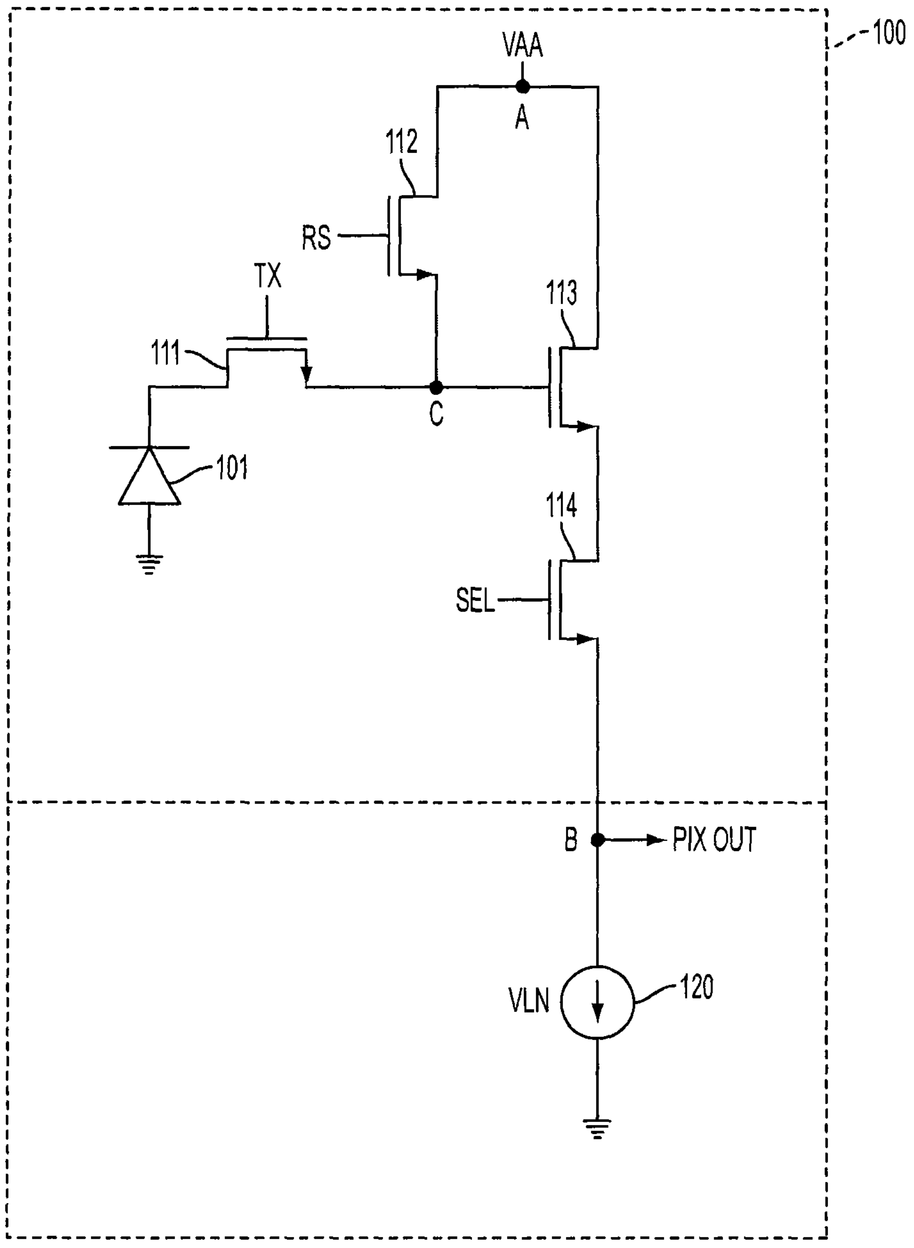
FIG. 2 illustrates a conventional pixel and an associated load circuit.

FIG. 2 is an illustration of a conventional four transistor (4T) pixel 100 and an associated load circuit 120 (shown as a current source). The pixel 100 includes a light sensitive element 101, shown as a photodiode, a floating diffusion (FD) region C, and four transistors, namely, a transfer transistor 111, a reset transistor 112, a source follower transistor 113, and a row select transistor 114. The pixel 100 accepts a TX control signal for controlling the conductivity of the transfer transistor 111, a RS control signal for controlling the conductivity of the reset transistor 112, and a SEL control signal for controlling the conductivity of the row select transistor 114. The charge at the floating diffusion region C controls the conductivity of the source follower transistor 113. The output of the source follow transistor 113 is presented to load circuit 120 through the row select transistor 114, in which the latter outputs a pixel signal at node B, when the row select transistor 114 is conducting (i.e., when SEL is asserted).

The states of the transfer and reset transistors 111, 112 determine whether the floating diffusion region C is coupled to the light sensitive element 101 for receiving photo generated charge generated by the light sensitive element 101 during a charge integration period, or a source of pixel power VAA from node A during a reset period.

The pixel 100 is operated as follows: The SEL control signal is asserted to cause the row select transistor 114 to conduct. At the same time, the RS control signal is asserted while the TX control signal is not asserted. This couples the floating diffusion region C to the pixel power VAA at node A, and resets the voltage at node C to an initial voltage. The pixel 100 outputs a reset signal VRST to the load circuit 120. Node B is coupled between the row select transistor 114 and the load circuit 120 and serves as an input to a sample and hold circuit (not shown) that samples and holds the pixel reset voltage VRST.

After the reset signal VRST has been output, the RS control signal is deasserted. The light sensitive element 101 has been exposed to incident light and accumulates charge on the level of the incident light during a charge integration period. After the charge integration period and the output of the signal VRST, the TX control signal is asserted. This couples the floating diffusion region C to the light sensitive element 101. Charge flows through the transfer transistor 111 and diminishes the voltage at the floating diffusion region C. The pixel 100 outputs a photo signal VSIG to the load circuit 120 which appears at node B and is sampled by the sample and hold circuit (not shown). The reset and photo signals VRST, VSIG, are different components of the overall pixel output (i.e., Voutput=VRST−VSIG).

The pixel 100 is susceptible to a type of distortion known as eclipsing. Eclipsing refers to distortion arising when a pixel outputs a signal corresponding to a dark pixel even though bright light is incident upon the pixel. Eclipsing can occur when a pixel is exposed to bright light, as the light sensitive element 101 can produce a large quantity of photogenerated charge. While the pixel 100 is outputting the reset signal VRST, a portion of the photogenerated charge produced by the light sensitive element 101 during an ongoing integration period may spill over the transfer transistor 111 into the floating diffusion node C. This diminishes the reset voltage at the floating diffusion node and can cause pixel 100 to output an incorrect (i.e., diminished voltage) reset signal VRST. This, in turn, can cause the reset and photo signals VRST, VSIG, to be nearly the same voltage. For example, the photo and reset signals VRST, VSIG, may each be approximately 0 volts. The pixel output (VRST−VSIG) can, therefore, become approximately 0 volts, which corresponds to an output voltage normally associated with a dark pixel.

An anti-eclipse (AE) circuit can be used to minimize the effect of eclipsing. For example, since during eclipse a pixel's reset voltage tends to drop towards zero volts, an anti-eclipse circuit can monitor the voltage level of the reset signal. If the voltage level drops below a threshold voltage, the anti-eclipse circuit can assume that the eclipsing may occur (or is occurring) and then correct the voltage level of the reset signal by pulling the reset level up to a correction voltage, thereby minimizing the eclipsing effect.

A currently pending application U.S. patent Ser. No. 13/096,334, titled "ECLIPSE DETECTION USING DOUBLE RESET SAMPLING FOR COLUMN PARALLEL ADC," filed on Apr. 28, 2011, by one of the present inventors, describes AE circuits for an imager. This application is incorporated herein by reference in its entirety.

Figure 3:
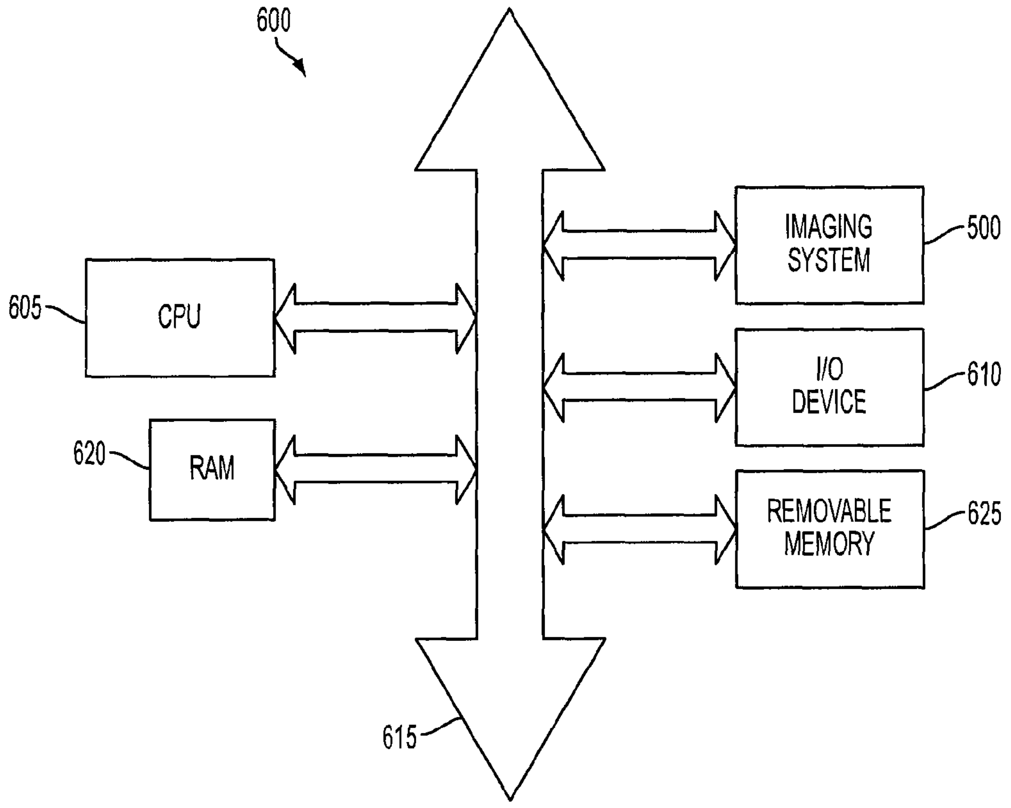
FIG. 3 is a block diagram of the imager of FIG. 1 communicating with other devices by way of a bus.

FIG. 3 illustrates a processor-based system 600, for example a camera system, which generally includes a central processing unit (CPU) 605, such as a microprocessor, that communicates with an input/output (I/O) device 610 over a bus 615. The system 600 also includes an imaging device 500 constructed in accordance with any of the embodiments of the invention. Imager 500 also communicates with the CPU 605 over bus 615. The processor-based system 600 also includes random access memory (RAM) 620, and can include removable memory 625, such as a flash memory, which also communicates with CPU 605 over bus 615. Imager 500 may be combined with a processor, such as a CPU, digital signal processor, or microprocessor, with or without memory storage on a single integrated circuit or on a different chip than the processor.

Figure 4:
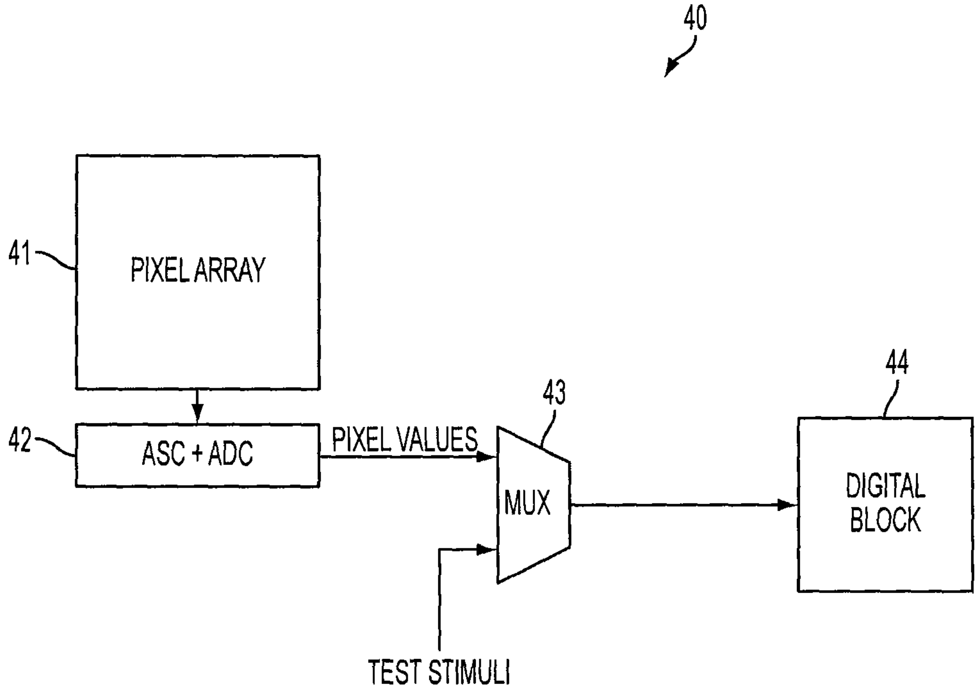
FIG. 4 is a block diagram of an imager with a self test capability, in accordance with an embodiment of the present invention.
Figure 5:
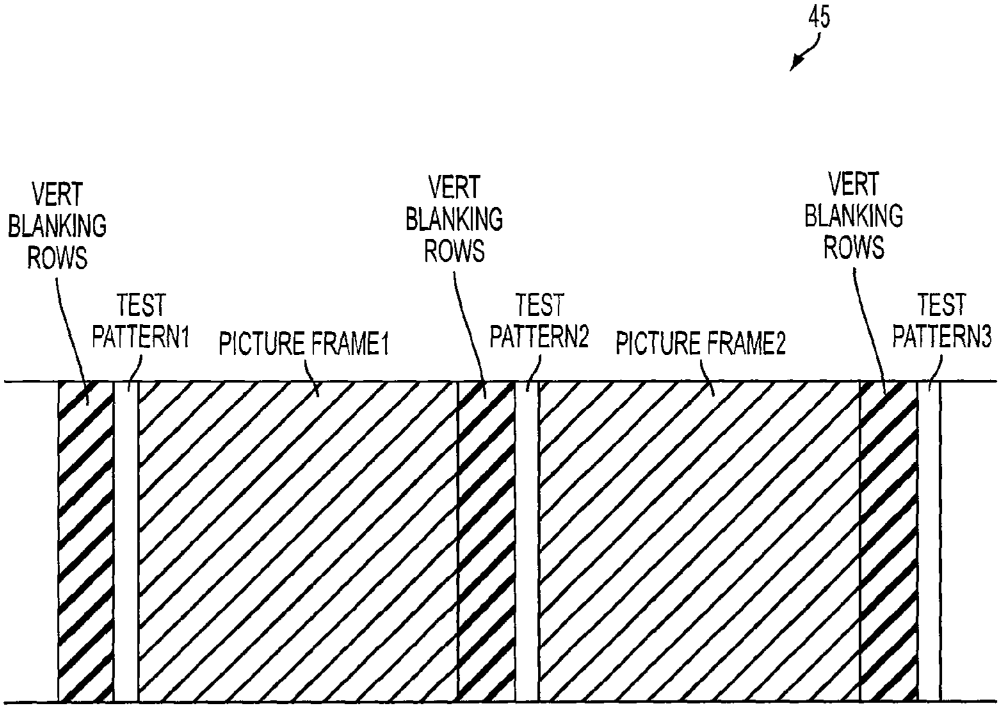
FIG. 5 depicts a sequence of frames including the vertical blanking period which includes a test pattern in accordance with an embodiment of the present invention.

An example of the present invention is shown in FIGS. 4 and 5. As shown, imager system 40 includes pixel array 41; analog signal chain (ASC) and ADC 42 (sometimes referred to as (ASC+ADC block 42)); and multiplexer (MUX) 43. It will be appreciated that pixel array 41 may be similar to pixel array 56 (FIG. 1); and (ASC+ADC) block 42 may be similar to column amplifiers 72 and ADCs 60 (FIG. 1).

The pixel values provided by (ASC+ADC) block 42 are multiplexed with a test stimuli by way of MUX 43. The output data from MUX 43 provides part of the digital data processing path, which may be controlled by blocks 58, 66 and 70 (FIG. 1) and stored in memory blocks 62 and 64. (FIG. 1).

The test stimuli is preferably inserted in the signal data path as early as possible, in order to obtain maximum test coverage of the signal data path. As shown in FIG. 4, the test stimuli is inserted after the ADCs. (Other embodiments, described later, insert the test stimuli earlier in the signal data path).

In one embodiment of the present invention, the test stimuli is inserted during vertical blanking time, so that the regular data is not disturbed. Test stimuli is processed, similarly to regular pixel output data, thereby checking correctness of the data processing logic. FIG. 5 shows one example of the test stimuli inserted during vertical blanking of each consecutive picture frame. Thus, test pattern 1 is inserted prior to picture frame 1, test pattern 2 is inserted prior to picture frame 2, and so on.

The test stimuli may include, for example, a full frame test pattern, such as a checker pattern, a fade-to-grey pattern, etc.

The test stimuli may also test high dynamic range (HDR) imagers. It will be appreciated that in HDR imagers, each pixel is represented by multiple values (multiple integration times), e.g. T1, T2 and T3. In one arrangement, for example array 14 of FIG. 6 may use alternating pairs of rows in an interlaced pattern to obtain image data that can be used to capture high dynamic range scenes. With this type of arrangement, multiple exposures are captured using an array 14 that has pixels 18 formed in an interleaved pattern such that each image sensing pixel 18 receives only one of the exposures. For example, half of pixels 18 in array 14 may be integrated (i.e. exposed) for time T1 and half of pixels 18 in array 14 may be integrated for time T2. With this type of arrangement, array 14 may be used to capture two images of a scene using two different exposures that overlap, at least partially in time. While typically described herein as including two exposures, in general, array 14 may be used to capture any number of exposure (e.g., three exposures, four exposures, five exposures, etc.) at least partially simultaneously.

Figure 6:
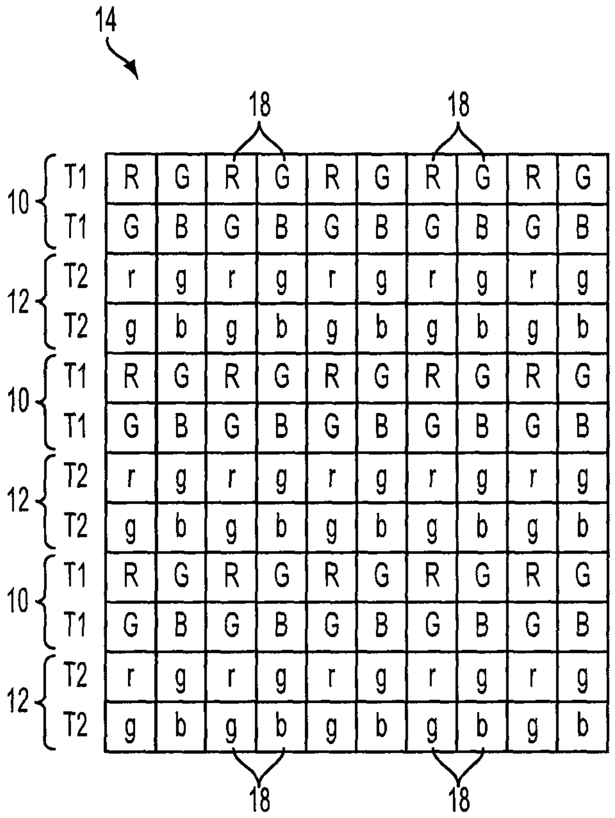
FIG. 6 is an example of pixels in a pixel array being exposed in a high dynamic range (HDR) environment.

FIG. 6 shows an illustrative color filter array (CFA) which uses the well known Bayer filter pattern for red, blue, and green pixels (e.g. 50% green, 25% red, and 25% blue). As an example, the color filter array may be overlaid on top of image sensor array 14. When capturing a high dynamic range image, row pairs 10 may be integrated (i.e. exposed) for time T1 while row pairs 12 may be integrated for time T2. With this type of arrangement, pixels 18 in row pairs 10 may be able to capture portions of a scene with low brightness levels, while pixels 18 in row pairs 12 may be able to capture portions of the scene that have high brightness levels.

When testing HDR images, all possible combinations may be covered by the test stimuli. This requires multiple frames. For example, a 20 bit HDR imager needs to test 2^20 pixels values. In a 1230×960 imager, this requires 819 frames, assuming 1 test stimuli row per frame. At 30 fps this takes 27 seconds for complete coverage. If this is not sufficiently fast, then multiple rows may be used for the test stimuli.

HDR imagers typically include special digital processing to reduce image artifacts caused by fast motion in the captured scene. Such motion compensation schemes may also be tested. This may be done by ensuring that the T1, T2, and T3 stimuli data are configured in such a way as to emulate fast motion. For instance, by shifting laterally the T1 image compared to the T2 image and T3 image, the present invention emulates motion. As a result, the motion compensation algorithms would be 'triggered' by detecting motion and processing the pixels correspondingly. Since the stimuli is deterministic, so is the final output which may be checked against a 'golden reference image.' This check may be either integrated on the imager or performed by an off-chip processor.

Figure 7A:
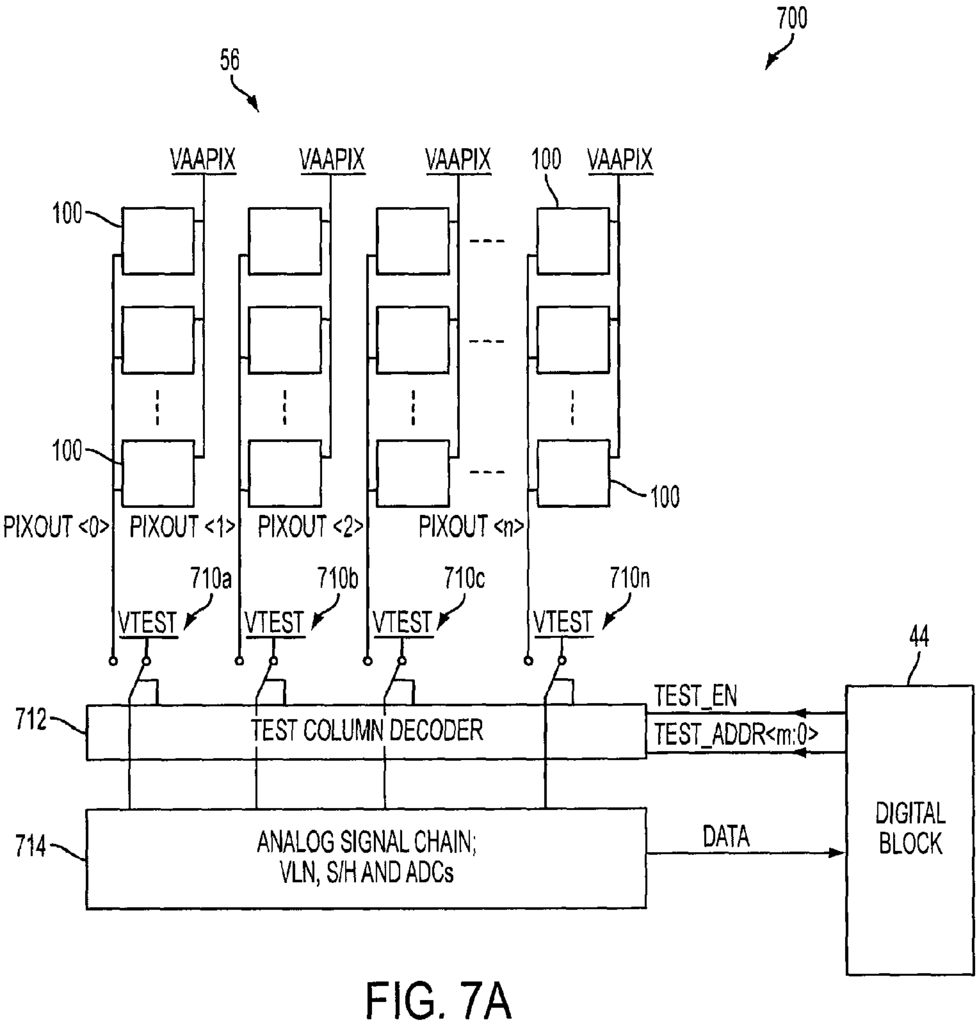
FIGS. 7A and 7B are block diagrams depicting an imager including a self test capability, in accordance with an embodiment of the present invention.
Figure 7B:
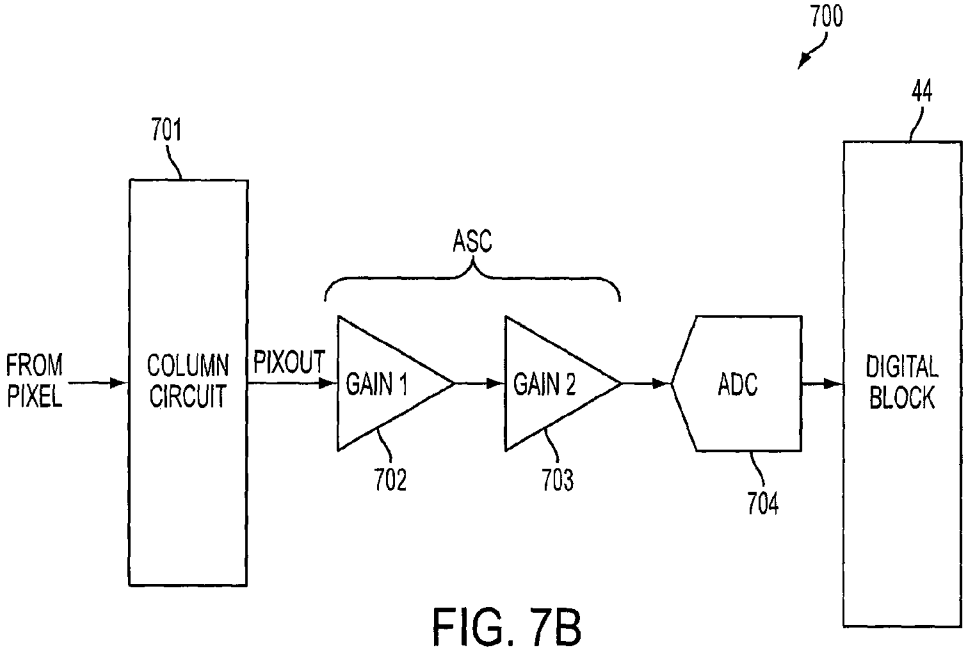

In another example of the present invention, an online test of the signal data path is provided while streaming images without loss of image resolution. Referring now to FIGS. 7A and 7B, there is shown imager 700 which includes circuitry for running online tests of the imager's signal data path. As shown, imager 700 is structured in a column parallel architecture, in which there is one ADC per pixel column.

Referring first to FIG. 7A, imager 700 includes pixel array 56 which includes multiple pixel circuits, each generally designated as 100. Each column of pixel array 56 provides a pixel output, shown as PIXOUT. For example, the first column provides PIXOUT 0, the next column provides PIXOUT 1, and the third column provides PIXOUT 2. There exists a PIXOUT for each column in the pixel array. The last column is shown designated as PIXOUT n.

Referring next to FIG. 7B, there is shown a single column of imager 700. As shown, the first column, designated as 701 provides PIXOUT as an output. The pixel output is next provided to an analog signal chain (ASC), which, as an example, includes two amplifiers 702 and 703. It will be appreciated, however, that the ASC may include more or less than the two amplifiers shown in the figure. It is also possible that the ASC may include no amplifiers. The output from the analog signal chain is provided to an analog to digital converter (ADC) designated as 704 which digitizes the pixel output signal. The output from the ADC is provided from digital block 44, which may be a processor, or a microcontroller, for example.

It will be appreciated that imager 700 includes a separate column circuit 701 for each column of the pixel array and a corresponding analog signal chain, and a corresponding ADC.

Referring now to FIG. 7A, imager 700 is shown as including an analog signal chain (ASC), a sample-and-hold (S/H) circuit and an ADC circuit. These circuits are shown as being included in a single block designated as 714. In addition, block 714 includes a load circuit for each pixel output line, generally shown as VLN. A single load of VLN is represented by a current source 120 in FIG. 2. It will be appreciated that each PIXOUT line includes a load VLN.

The output from 714 is shown as providing digital data of each pixel in pixel array 56, as data to be processed by digital block 44.

In an embodiment of the present invention, imager 700 includes multiple test switches, shown designated as 710*a*, 710*b*, 710*c*, and so on, and finally 710*n*. Each test switch selectively provides either a PIXOUT signal from each column of pixel array 56, or test signal, shown as VTEST. A test column decoder, designated as 712, decodes a test address and a test enable signal provided from digital block 44. For example, the test address may designate any pixel in pixel array 56.

Figure 8A:
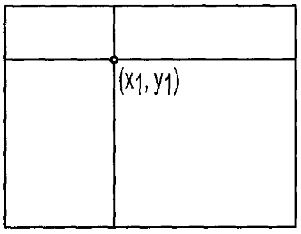
FIGS. 8A, 8B and 8C depict addresses of the three different pixels in the different image frames, respectively.
Figure 8B:
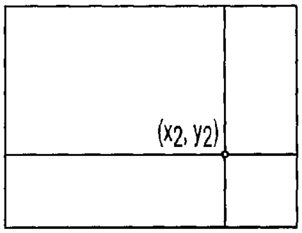
Figure 8C:
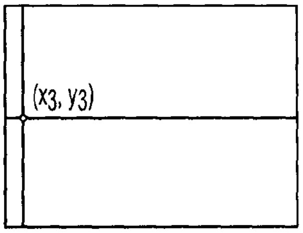

For example, FIGS. 8A, 8B and 8C shows the designation of three different pixels, namely, pixel (X1, Y1), pixel (X2, Y2) and pixel (X3, Y3). Thus, each test address provided from digital block 44 is sent to test column decoder 712, in which the latter decodes the address. Thus, the test address includes a pixel in the first column of pixel array 56, then switch 710*a* is enabled by the test enable signal. Similarly, if the test address designates a pixel in the second column, then test switch 710*b* is enabled. As shown in FIG. 7A, test switch 710*a* through 710*n* are all shown as disconnected from each PIXOUT line and, instead, connected to the test signal line.

It will be understood as contemplated by the present invention, one test switch 710 or more than one test switch 710 may be simultaneously enabled.

When the test column decoder 712 enables a specific test switch, than that corresponding test switch provides a test signal to the analog signal chain, the VLN, the sample/hold, and ADC of each column in pixel array 56.

Accordingly, the output data from block 714 may include normal column pixel output data or test generated data.

It will be appreciated that the built-in test shown in FIG. 7A, applies to image sensors having one ADC per pixel column. When sampling a row of pixels, the pixel for which the ADC is tested, for example, is disconnected and an output which is replaced by a test voltage for both reset and signal sampling is used. The ADC converts the test voltage into a digital value, and when the digital block 44 scans the column memory, it knows which (if any) column has been selected by digital block 44 to perform the ADC test. By comparing the ADC output from the tested column to an expected value based on the input voltage provided by the test signal digital block 44, it is possible to verify whether or not the ADC is working as expected. Similarly, the column load circuit may be tested, the analog signal chain may be tested, and the sample/hold circuit may also be tested.

Figure 9A:
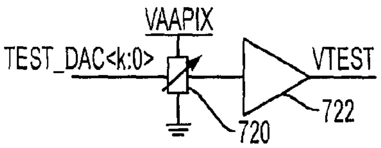
FIG. 9A is a block diagram of a test generator used by the present invention.

Referring next to FIG. 9A, there is shown an example of a generator for generating the test signal, VTEST, provided as one of the signals to the switches 710. As shown, digital block 44 may generate a digital signal, shown as Test DAC in FIG. 9A. The digital test signal is converted into an analog signal by way of digital to analog converter 720 and provided to buffer 722. The buffered signal is provided as the test signal, VTEST.

Figure 9B:
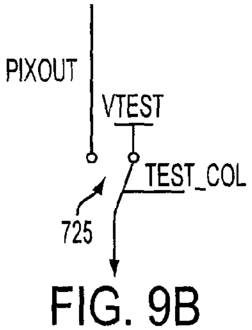
FIGS. 9B, 9C and 9D depict examples of three different test switches, in accordance with an embodiment of the present invention.
Figure 9C:
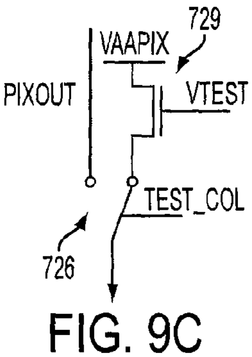
Figure 9D:
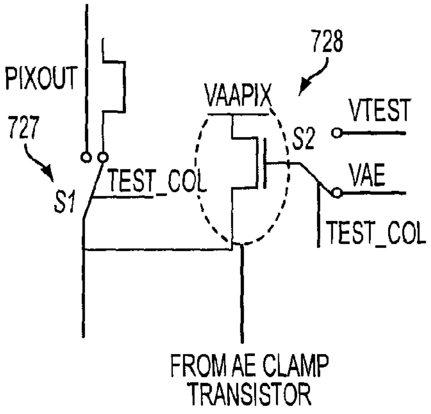

Three different implementations for the per column test circuit is shown, respectively, in FIGS. 9B, 9C and 9D. Test switch 725, in FIG. 9B, provides a simple test switch in which a test voltage, VTEST, is directly provided to the corresponding column output, the latter shown as test column TEST_COL.

Another example of a test switch is shown as test switch 726 which provides its test column output from either the pixel output signal, or the output of a source follower transistor 727 which receives the generated test signal by way of its input gate. One of the nodes of the source follower transistor is connected to the supply voltage, VAAPIX. It may be appreciated that source follower 729 provides a low capacitive load to the test bus output and is simple to implement.

Yet another configuration for a test switch is shown in FIG. 9D. As shown, test switch 727 receives its test signal by way of source follower transistor 728. The input to the gate of transistor 728 is controlled by a switch S2 which selects either the test generated signal or an anti-eclipsing (AE) reference voltage. The output nodes of transistors 728 are connected to the supply voltage of VAAPIX and an output of the AE clamp transistor (not shown).

Figure 10:
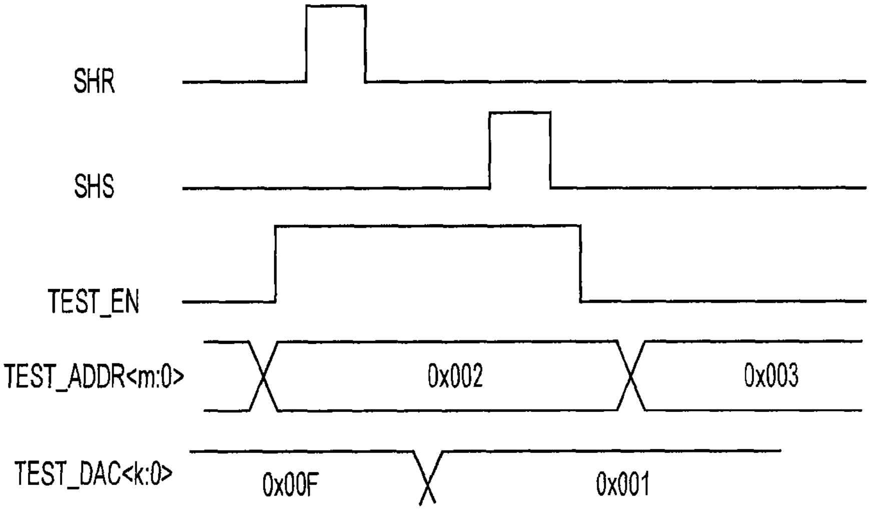
FIG. 10 is a timing diagram showing the period in which the test is generated, in accordance with an embodiment of the present invention.

Referring now to FIG. 10, there is shown a timing diagram. As shown, a reset sampling (SHR) pulse and a signal sampling (SHS) pulse are provided in a conventional manner in a digital block 44. The duration of the test enable signal is shown as spanning between the two sampling pulses. In addition, the test address generated by digital block 44 is provided during the test enable signal. The test voltage is changed between the reset sampling pulse and the signal sampling pulse. This forms the desired input voltage to the respective column being testing.

If the test voltage source is disconnected during SHS (while not connecting the pixout again), the VLN current source will pull the column's input to ground. Thus, it is not necessary to change the test DAC setting between SHR and SHS. The input to the column will become the test voltage sampled during SHR, minus AGND, which has been sampled during SHS. This simplifies the test DAC structure, but introduces an inaccuracy because threshold voltage variation from a source follower transistor (as in FIGS. 9C and 9D) is not cancelled.

Figure 11:
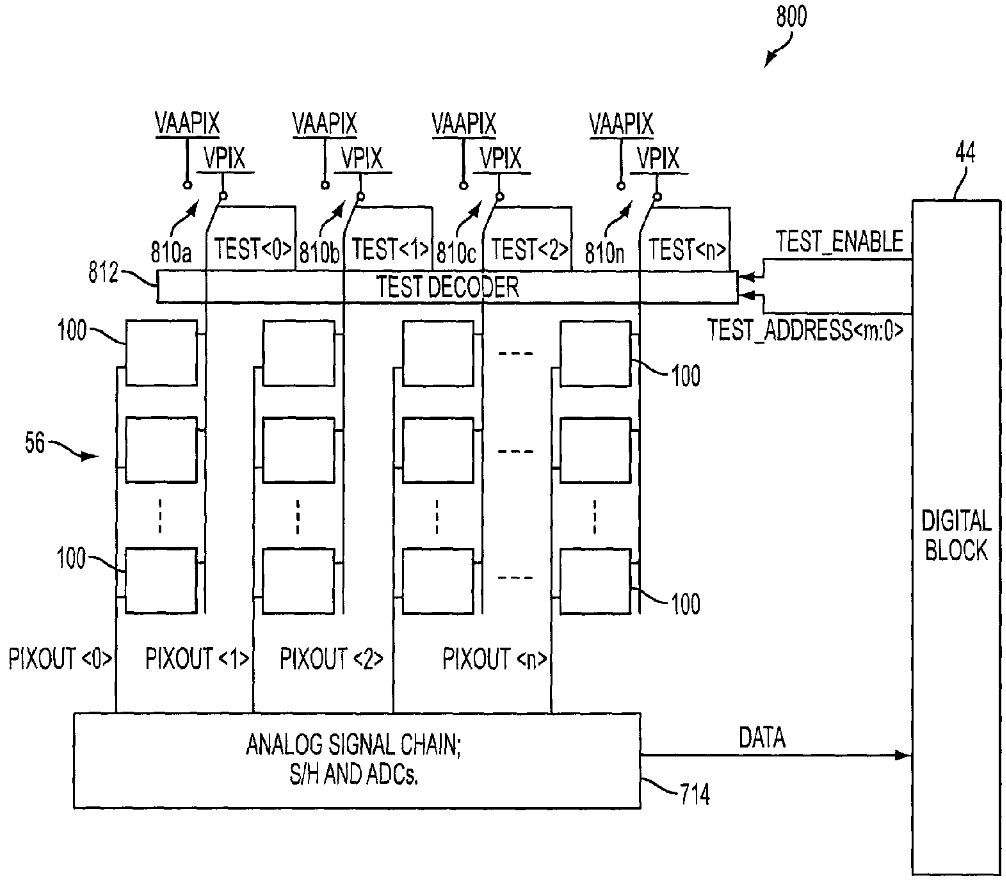
FIG. 11 is a block diagram depicting an imager including yet another self test capability, in accordance with yet another embodiment of the present invention.

If there is no VAAPIX grid over the pixel array, but the power is routed vertically, switches may be added at the top of each column of pixels, as shown in yet another example in FIG. 11. As shown, when VAAPIX is disconnected, it is replaced by a test voltage, VPIX, which may be delivered by a DAC and a buffer, similar to that shown in FIG. 9A. This way, VPIX may be lowered during pixel reset, flushing the pixel PD and, thus, injecting a known signal into the pixel.

As shown in FIG. 11, imager 800 includes pixel array 56 and analog signal chain 714. The output from the analog signal chain, and the other circuits in the chain, including the ADC, provide digital data to digital block 44. The output from each column line is provided conventionally to block 714. Test decoder 812, however, is inserted at the top of FIG. 11. Each column in pixel array 56 includes a test switch, namely, 810*a*, 810*b*, 810*c*, etc., and 810*n*. Based on the test address and the test enable command from digital block 44, test decoder 812 enables the appropriate test switch by way of the test enable 0, test enable 1, test enable 2, etc., and test enable n.

In order to replace the missing pixel information, the pixel from the tested column may be interpolated in the same manner as known hot or cold pixels, which are found during production test and whose location is written to the sensor's OTPM. The loss of data will likely be minimal. Also, since the pixel which is being interpolated moves around from column to column, there will likely be no visual effect. If the digital block chooses which ADC and row to test it does so in a semi-randomly manner (e.g. by using an LFSR). The danger of introducing a fixed patter noise FPN will likely be further reduced. An example of how the tested pixel may move around from frame to frame is illustrated in FIGS. 8A-8C.

If a sensor having 2320 columns, for example, is capable of running at 60 fps, and one ADC is tested per frame, the sensor ADC's would run a test cycle about every 40 seconds, while only having to interpolate one pixel per frame.

Injecting a test voltage, as shown in FIG. 11, may be done by lowering VAAPIX voltage for the column to be tested, either during signal sampling or during shutter modes.

Using VAAPIX power switches per column, as shown in FIG. 11, facilitates testing of the entire pixel. The power switch may be able to disconnect the column from the global VAAPIX and connect it to a local voltage (VPIX) from an on-chip DAC. If the VPIX is stepped, so that a known voltage is injected to the pixels PD during shutter, it may later be read out through the entire signal chain. The downside to this method is that it is susceptible to eclipse, and any signal due to incident light adds up to the injected voltage. By lowering VAAPIX during signal sampling, the present invention forces the pixel output lower than it would normally go (but this is not a very accurate solution).

Both of the suggested forms of implementation shown in FIGS. 7 and 11, require an extra column decoder before the sampling, in order to select which column is to be tested. It may be beneficial to include a test-all-signal. Such a decoder probably increases the column height by about 10 microns for a 3 megapixel sensor with 2.2 µm pixel pitch.

In imager 760 of FIG. 7, the load for the test bus is quite low, since there is only one SF per column. Thus, the routing for the test voltage may be narrow and does not occupy a lot of area. The bus load is purely capacitive and does not increase when more ADCs are tested. A benefit from this is that the testing technique can be used for testing all the ADCs at once. Also, the buffer which drives the test voltage may be small (e.g. a simple class A OTA) since it only sees a load of a couple of pF. There may even be a test switch on the buffer's input, allowing buffering of a voltage from the test pad to the ADCs. Such a testing scheme (typically in production test) removes any uncertainty regarding on-chip references.

If the sensor timing permits, a test row may be used to run ADC test for all the columns during vertical blanking. The simplest form of testing is where all the ADCs sample the same test voltage versus AGND and convert the resulting value as some type of midlevel image, giving information about the condition of each ADC. This is valuable to confirm that none of the ADCs are hot/cold, to provide coefficients for column correction etc.

A more advanced test in vertical blanking may be performed by using the test row's column decoder to select whether one or several columns are to (a) sample the test voltage versus AGND or (b) sample the test voltage twice. The first version gives a signal output determined by the test voltage, and the second version gives zero output. By programming the column decoder in a known pattern of columns with either version, the digital block may verify that the sensor's column read sequence is correct It will be appreciated that the same embodiments, described above may be applied to a serial readout architecture. The sampling scheme may be the same, but it primarily focuses on testing the column circuitry (VLN, AE, VCL, sampling capacitors and column decoder) since the ADC is common to all columns. Since the column routing in serial architectures tends to be less congested than in column parallel architectures, it may be possible to re-use the existing column decoder, combined with some simple logic, to select which column samples the test voltage.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An imager including a self test mode comprising: a pixel array for providing pixel output signals, a plurality of analog-to-digital converters (ADCs) for converting the pixel output signals into pixel digital data, a digital processor for processing the pixel digital data, and a multiplexer for receiving a test signal and the pixel digital data, wherein the multiplexer provides the test signal to the digital processor for testing the imager.

2. The imager of claim 1 wherein the test signal includes a row of pixel values.

3. The imager of claim 1 wherein the test signal includes a full frame test pattern.

4. The imager of claim 1 wherein the test signal is provided by the multiplexer to the digital processor during a vertical blanking period of the imager.

5. The imager of claim 1 wherein the test signal includes multiple values for each pixel in at least one row of pixels, and the multiple values are provided to the multiplexer during multiple vertical blanking periods of the imager.

6. A self-testing imaging system comprising:

a plurality of pixels that generate pixel output values;

a plurality of analog-to-digital converters that convert the pixel output values to digital pixel values;

a multiplexer that receives the digital pixel values and a test stimulus and that multiplexes the digital pixel values with the test stimulus to generate test data; and a processor that receives the test data and compares the test data with predetermined test data.

7. The self-testing imaging system of claim 6, wherein the test stimulus comprises digital test stimulus values corresponding to a selected row of pixels in the plurality of pixels.

8. The self-testing imaging system of claim 7, wherein the digital test stimulus values are multiplexed with the digital pixel values generated by the selected row of pixels to generate the test data.

9. A method of testing an imaging system, comprising:

generating pixel output values with a pixel array;

converting the pixel output values to digital pixel data with analog-to-digital converter circuitry;

receiving the digital pixel data and test values at a multiplexer;

with the multiplexer, multiplexing the digital pixel data and the test values to produce test data; and comparing the test data to predetermined test data.

10. The method defined in claim 9, wherein the pixel output values are generated by a row of pixels in the pixel array.

11. The method defined in claim 9, wherein the test values are received at the multiplexer during a vertical blanking time of the imaging system.

12. The method defined in claim 10, wherein the test values correspond to the row of pixels in the array.

13. The method defined in claim 10, further comprising:

generating test signals with a test voltage generator; and receiving the test signals at the analog-to-digital converter circuitry.

14. The method defined in claim 13, further comprising:

with the analog-to-digital converter circuitry, digitizing the test signals to generate the test values that are received at the multiplexer.

15. The method defined in claim 11, wherein the test values are received from the analog-to-digital converter circuitry.

16. The self-testing imaging system of claim 7, further comprising:

a test voltage generator that provides test voltages to the plurality of analog-to-digital converters.

17. The self-testing imaging system of claim 16, wherein the plurality of analog-to-digital converters convert the test voltages to the digital test stimulus values that are received at the multiplexer.

18. The self-testing imaging system of claim 16, wherein the test voltage generator provides the test voltages are to the analog-to-digital converters during a vertical blanking time of the imaging system.

19. The self-testing imaging system of claim 18, wherein a ground voltage is provided to the analog-to-digital converters during the vertical blanking time of the imaging system.

20. The self-testing imaging system of claim 18, wherein the test voltage generator provides one of the test voltages and an additional test voltage to at least one of the analog-to-digital converters during the vertical blanking time of the imaging system.

* * * * *